United States Patent
Takanashi et al.

(10) Patent No.: US 8,634,128 B2
(45) Date of Patent: Jan. 21, 2014

(54) ELECTROPHORETIC ELEMENT, DISPLAY, AND ELECTRONIC DEVICE

(75) Inventors: Hidehiko Takanashi, Kanagawa (JP); Ken Kobayashi, Kanagawa (JP); Aya Shuto, Kanagawa (JP)

(73) Assignee: Sony Corporation (JP)

( * ) Notice: Subject to any disclaimer, the term of this patent is extended or adjusted under 35 U.S.C. 154(b) by 140 days.

(21) Appl. No.: 13/412,767

(22) Filed: Mar. 6, 2012

(65) Prior Publication Data

US 2012/0243073 A1 Sep. 27, 2012

(30) Foreign Application Priority Data

Mar. 22, 2011 (JP) .................. 2011-062922

(51) Int. Cl.
- *G02B 26/00* (2006.01)
- *G02F 1/133* (2006.01)
- *G09G 3/34* (2006.01)
- *G03G 17/04* (2006.01)

(52) U.S. Cl.
USPC ............... 359/296; 349/33; 345/107; 430/32

(58) Field of Classification Search
USPC ......... 359/296, 245, 253–254, 290–291, 298; 349/33; 345/49, 105, 107; 430/31–32
See application file for complete search history.

(56) References Cited

U.S. PATENT DOCUMENTS

| | | | |
|---|---|---|---|
| 3,892,568 A | 7/1975 | Ota | |
| 6,661,563 B2 * | 12/2003 | Hayashi et al. | 359/296 |
| 2001/0041339 A1 * | 11/2001 | Anderson et al. | 435/6 |
| 2008/0112040 A1 * | 5/2008 | Suwabe et al. | 359/296 |

FOREIGN PATENT DOCUMENTS

| | | |
|---|---|---|
| JP | 50-15115 | 6/1975 |
| JP | 50-15120 | 6/1975 |
| JP | 2002-244163 | 8/2002 |
| JP | 2005-107146 | 4/2005 |
| JP | 2005-128143 | 5/2005 |
| JP | 4188091 | 9/2008 |

* cited by examiner

*Primary Examiner* — Dawayne A Pinkney
(74) *Attorney, Agent, or Firm* — Sheridan Ross P.C.

(57) ABSTRACT

An electrophoretic element includes an electrophoretic particle, and a porous layer formed of a fibrous structure having a non-electrophoretic particle with different optical reflection characteristics from optical reflection characteristics of the electrophoretic particle. A difference $\Delta 1$ ($=A-B$) between a solubility parameter value A of the fibrous structure and a solubility parameter value B of a particle surface of the electrophoretic particle is 2 or more and 5.2 or less.

7 Claims, 6 Drawing Sheets

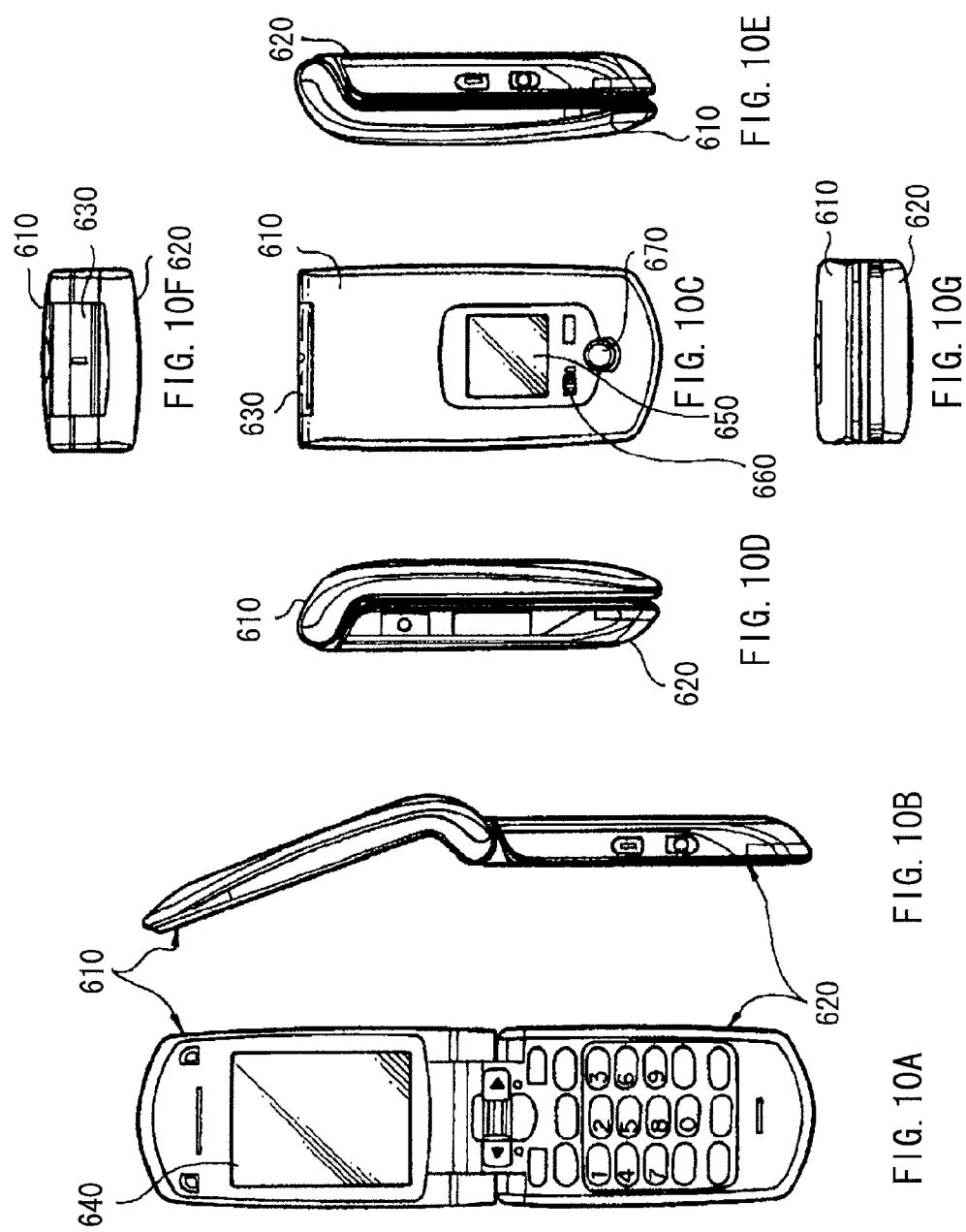

ELECTROPHORETIC ELEMENT, DISPLAY, AND ELECTRONIC DEVICE

BACKGROUND

The present technology relates to an electrophoretic element including an electrophoretic particle and a porous layer, a display using the electrophoretic element, and an electronic device using the display.

In recent years, with the popularization of various electronic devices such as cell-phones and personal digital assistants (PDAs), the demand for a display having low power consumption and high-definition image quality has increased. Specifically, recently, with launch of an electronic book distribution service, an electronic book reader for reading, which has an intention of reading character information for a long time, has attracted attention, and it is desirable to produce a display having a suitable display quality for the application.

Displays for reading such as a cholesteric liquid crystal display, an electrophoresis display, an electrochromic display, and a twist ball type display have been proposed, and specifically preferred is that classified as a reflection type. Since the reflection type display employs the reflection (scattering) of outside light like paper to provide light display, paper-like display quality is obtainable. Additionally, there is no need to prepare a backlight, and power consumption then decreases.

A candidate of the reflection type displays is an electrophoretic display creating light and dark (contrast) using an electrophoretic phenomenon, since the power consumption is low and high-speed response is excellent in the electrophoresis display. Then, various studies have been made on a display method of the electrophoretic display.

Particularly, there is a proposed method of dispersing two kinds of charged particles having different optical reflection characteristics and different polarities in an insulating liquid to cause the movement of each charged particle using the difference in polarity in response to an electric field (for example, see Japanese Exampled Patent Application Publication No. 50-015115 and Japanese Patent No. 4188091). In this method, the distribution of two kinds of charged particles changes in response to an electric field, and contrast is then created with use of a difference in optical reflection characteristics between the charged particles.

There is also a proposed method of dispersing charged particles in an insulating liquid and also arranging a porous layer having different optical reflection characteristics from those of the charged particles to cause the movement of the charged-particles passing through fine pores of the porous layer in response to an electric field (for example, see Japanese Unexamined Patent Application Publication Nos. 2005-107146, 2005-128143, and 2002-244163, and Japanese Examined Patent Application No. 50-015120). As the porous layer, a polymer film having fine pores formed by a drilling process using a laser beam, a knitted fabric made from synthetic fiber, an open-cell porous polymer, or the like is used. In the method, the distribution of charged particles changes in response to an electric field, and contrast is created with use of a difference in optical reflection characteristics.

SUMMARY

Although various display methods of the electrophoretic display have been proposed, the display quality is still insufficient. Thus, from the view point of the development into a color and movie displays, and the like, there may be a need to further improve contrast performance of a display.

It is desirable to provide an electrophoretic element, a display, and an electronic device which have improved contrast performance.

An electrophoretic element according to an embodiment of the present technology includes an electrophoretic particle, and a porous layer formed of a fibrous structure having a non-electrophoretic particle with different optical reflection characteristics from optical reflection characteristics of the electrophoretic particle. A difference $\Delta 1$ ($=A-B$) between a solubility parameter value A of the fibrous structure and a solubility parameter value B of a particle surface of the electrophoretic particle is 2 or more and 5.2 or less.

A display according to an embodiment of the present technology includes an electrophoretic element between a pair of substrates, one or both of the substrates being optically transmissive. The electrophoretic element has an electrophoretic particle and a porous layer formed of a fibrous structure having a non-electrophoretic particle with different optical reflection characteristics from optical reflection characteristics of the electrophoretic particle. A difference $\Delta 1$ ($=A-B$) between a solubility parameter value A of the fibrous structure and a solubility parameter value B of a particle surface of the electrophoretic particle is 2 or more and 5.2 or less.

An electronic device according to an embodiment of the present technology includes a display having an electrophoretic element between a pair of substrates, one or both of the substrates being optically transmissive. The electrophoretic element has an electrophoretic particle and a porous layer formed of a fibrous structure having a non-electrophoretic particle with different optical reflection characteristics from optical reflection characteristics of the electrophoretic particle. A difference $\Delta 1$ ($=A-B$) between a solubility parameter value A of the fibrous structure and a solubility parameter value B of a particle surface of the electrophoretic particle is 2 or more and 5.2 or less.

The term "optical reflection characteristics" refers to, that is to say, light (outside light) reflectance. The difference in the optical reflection characteristics between the electrophoretic particles and the non-electrophoretic particles causes contrast.

The term "solubility parameter value" refers to a value defined by the regular solution theory introduced by Hildebrand, and is called "SP value". The solubility parameter value is hereinafter referred to as "SP value". The SP value is determined from the square root $(cal/cm^3)^{1/2}$ of the heat of vaporization required to vaporize 1 $cm^3$ of a liquid. Particularly, the SP value is calculated from the calculating formula, SP value=$(EN)^{1/2}$ (E represents mol cohesive energy, and V represents mol volume). Note that it is assumed that, in enthalpy of vaporization per mole, atoms or functional groups are additive. The SP value of a molecule is then expressed in the sum of the SP values of atoms and functional groups therein. The regular solution theory introduced by Hildebrand is described in detail in Hildebrand J. H., Scott R. L., "Solubility of Non-Electrolytes", 3rd ed. 1976, J. wiley & Sons 334, and also the SP values of atoms and functional groups are described in detail in Hideki Yamamoto, "SP value Base-Application and Calculation Method", 2005, Johokiko Co., Ltd.

The reason that it is focused on "the SP value of an electrophoretic particle surface" in order to confirm a SP value of the electrophoretic particle is that a substantial SP value of the electrophoretic particle is determined depending on the kind of atom or functional group on the surface of the electrophoretic particle. More particularly, when the electrophoretic particle is in a powder (particle) form made of a carbon material or the like, the SP value thereof is determined according to atoms or functional groups existing on the surface of the powder. Also, when the above particle is coated by a polymer material or the like, the SP value thereof is determined according to atoms or functional groups existing on the surface of the coating layer (such as a polymer material). When an electrophoretic particle has plurality of kinds of atoms or functional groups as described above, the SP value of the electrophoretic particle surface is determined by the sum of the SP values of the plurality of kinds of atoms or functional groups.

In the electrophoretic element, the display, or the electronic device according to the embodiments of the present technology, the porous layer is formed of a fibrous structure having a non-electrophoretic particle with optical reflection characteristics different from those of electrophoretic particle. The difference $\Delta 1$ ($=A-B$) between a solubility parameter value A of the fibrous structure and a solubility parameter value B of the electrophoretic particle surface is 2 or more and 5.2 or less, and thereby improved contrast is obtainable.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 10A to 10G are plan views respectively illustrating a configuration of a cell phone employing the display.

DETAILED DESCRIPTION

Embodiments of the present technology will be discussed in detail below with reference to the drawings. The embodiments will be described in the following order.
1. Electrophoretic Element
2. Application Example of Electrophoretic Element (Display)
3. Application Example of Display (Electronic Device)

[1. Electrophoretic Element]

Figure 1:
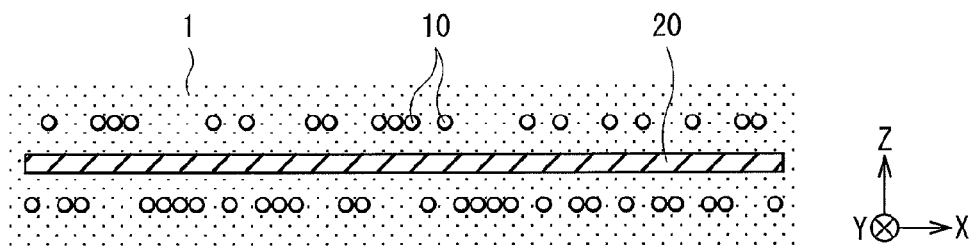
FIG. 1 is a cross-sectional view illustrating an electrophoretic element according to an embodiment of the present technology.

First, a configuration of an electrophoretic element according to an embodiment of the present technology is described. FIG. 1 illustrates a cross-sectional configuration of the electrophoretic element, and FIG. 2 illustrates an enlarged plan configuration of a main part of the electrophoretic element shown in FIG. 1.

[Entire configuration of Electrophoretic Element]

Figure 2:
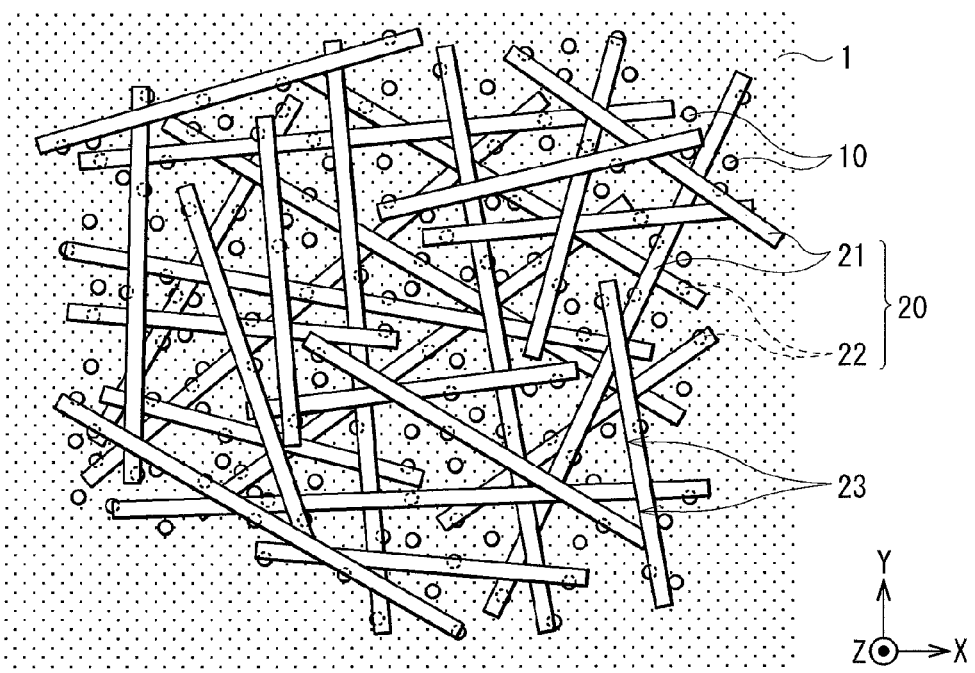
FIG. 2 is an enlarged plan view illustrating a configuration of the electrophoretic element.

The electrophoretic element according to the embodiment of the present technology, which utilizes an electrophoretic phenomenon to achieve contrast, has an electrophoretic particle 10 and a porous layer 20 as shown in FIGS. 1 and 2. The porous layer 20 is formed of a fibrous structure 21 having a non-electrophoretic particle 22 with optical reflection characteristics different from those of the electrophoretic particle 10 and also has a plurality of fine pores 23. In the electrophoretic element according to the embodiment of the present technology, the electrophoretic particle 10 and the porous layer 20 are placed, in for example, an insulating liquid 1.

[Insulating Liquid]

The insulating liquid 1 is one or two or more kinds of non-aqueous solvents such as organic solvents. Examples of the non-aqueous solvents include paraffin, isoparaffin, and fluorides thereof. Fluoride is that in which at least one hydrogen in paraffin or the like is substituted by fluorine. The viscosity and the refractive index of the insulating liquid 1 are preferably as low as possible. Thereby, the mobility (response speed) of the electrophoretic particle 10 is improved, and correspondingly, energy (power consumption) required to move the electrophoretic particle 10 decreases. In addition, since a difference in refractive index between the insulating liquid 1 and the porous layer 20 is increased, the porous layer 20 has higher optical reflectance.

Additionally, the insulating liquid 1 may contain various materials as needed. Examples of these materials include colorants, charge-controlling agents, dispersion stabilizers, viscosity modifiers, surfactants, and resins.

[Electrophoretic Particle]

The electrophoretic particle 10 is dispersed in the insulating liquid 1. The electrophoretic particle 10 is one or two or more charged particles (electrophoretic particles) electrically migrating in the insulating liquid 1, and is capable of moving by passing through the fine pores 23 of the porous layer 20 in response to an electric field. Additionally, the electrophoretic particle 10 is one or two or more kinds of particles (powders) of organic pigments, inorganic pigments, dyes, carbon materials, metal materials, metal oxides, glass, polymer materials (resins), or the like. The electrophoretic particle 10 may be a crushed particle of resin solids containing the above particle or an encapsulated particle with the above particle or the like. However, each material categorized as carbon materials, metal materials, metal oxides, glasses, or polymer materials is excluded from materials categorized as organic pigments, inorganic pigments, or dyes.

Examples of the organic pigments include an azo pigment, an azo metal complex pigment, a poly-condensed azo pigment, a flavanthrone pigment, a benzimidazolone pigment, a phthalocyanine pigment, a quinacridone pigment, an anthraquinone pigment, a perylene pigment, a perinone pigment, an anthrapyridine pigment, a piranthrone pigment, a dioxazine pigment, a thioindigo pigment, an isoindolinone pigment, a quinophthalone pigment, and an indanthrene pigment, and the like. Examples of the inorganic pigments include zinc oxide, antimony white, carbon black, iron black, titanium boride, colcothar, Mapico Yellow, red lead, cadmium yellow, zinc sulfide, lithopone, barium sulfide, cadmium selenate, calcium carbonate, barium sulfate, lead chromate, lead sulfate, barium carbonate, white lead, alumina white, and the like. Examples of dyes include a nigrosine dye, an azo dye, a phthalocyanine dye, a quinophthalone dye, an anthraquinone dye, and a methine dye, and the like. Examples of carbon materials include carbon black and the like. Examples of metal materials include gold, silver, copper, and the like. Examples of metal oxides include titanium oxide, zinc oxide, zirconium oxide, barium titanate, potassium titanate, copper-chromium oxide, copper-manganese oxide, copper-iron-manganese oxide, copper-chromium-manganese oxide, copper-iron-chromium oxide, and the like. Examples of polymer materials include a polymer compound in which a functional group has a light absorption region in a visible region, and the like. The kind of the polymer compound is not limited as long as the polymer compound has the light absorption region in the visible light region.

The content (concentration) of the electrophoretic particle 10 in the insulating liquid 1 is, for example, 0.1% by weight to 10% by weight, but is not particularly limited thereto. Such content allows the electrophoretic particle 10 to secure shielding property (hiding property) and mobility thereof. When the content is less than 0.1% by weight, the electrophoretic particle 10 may become hard to shield the porous layer 20. In contrast, when the content is more than 10% by weight, the dispersibility of the electrophoretic particle 10 is reduced, and thereby the electrophoretic particle 10 may be hard to migrate and may be agglutinated depending on circumstances.

The electrophoretic particle 10 has given optical reflection characteristics (optical reflectance). The optical reflectance of the electrophoretic particle 10 is not particularly limited, and is preferably set at least in order to allow the electrophoretic particle 10 to shield the porous layer 20. Contrast is thus achieved by utilizing the difference in optical reflectance between the electrophoretic particle 10 and the porous layer 20.

A Specific material for forming the electrophoretic particle 10 is selected depending on, for example, a function of the electrophoretic particle 10 to achieve contrast. Specifically, a material for forming the electrophoretic particle 10 to perform light display therewith is, for example, a metal oxide such as titanium oxide, zinc oxide, zirconium oxide, barium titanate, and potassium titanate, and preferably titanium oxide and the like. These materials for forming the electrophoretic particle 10 have, for example, a higher electrochemical stability and dispersibility and also provide higher reflectance in the electrophoretic particle 10. Further, a material for forming the electrophoretic particle 10 for performing dark display therewith is, for example, carbon materials or metal oxides, and preferably carbon materials. These materials for forming the electrophoretic particle 10 provide higher electrochemical stability, mobility, and optical absorptivity to the electrophoretic particle 10. Examples of carbon materials include carbon black. Examples of metal oxides include copper-chromium oxide, copper-manganese oxide, copper-iron-manganese oxide, copper-chromium-manganese oxide, and copper-iron-chromium oxide.

When light display is performed using the electrophoretic particle 10, an externally-visible color of the electrophoretic particle 10 is not particularly limited provided that it is capable of achieving contrast. Specifically, a color similar to white is preferable, and white is more preferable. When dark display is performed using the electrophoretic particle 10, the externally visible color of the electrophoretic particle 10 is not particularly limited provided that it is capable of achieving contrast. Specifically, a color similar to black is preferable, and black is more preferable. In both occasions, higher contrast is achieved.

In addition, it is preferred that the electrophoretic particle 10 easily disperse and be charged over the long term in the insulating liquid 1. Thus, to disperse the electrophoretic particle 10 by electrostatic repulsion thereon, dispersants (or charge conditioner) may be used, or the surface treatment on the electrophoretic particle 10 may be performed. Alternatively, both may be performed together.

Examples of dispersants include a Solsperse series manufactured by Lubrizol Corp., BYK or Anti-Terra series manufactured by BYK-Chemie, and Span series manufactured by ICI Americas Inc.

Examples of the surface treatment include rosin treatment, surfactant treatment, pigment derivative treatment, coupling agent treatment, graft polymerization, and microencapsulation. Specifically, graft polymerization or a microencapsulation, or a combination thereof is preferred, and the dispersion of the electrophoretic particle 10 thus becomes stable over the long term.

Surface-treatment material is a material having a functional group capable of being adsorbed on an electrophoretic particle 10 surface and a polymerizable functional group (adsorptive material), for example. A kind of a functional group capable of being adsorbed is determined according to the material for forming the electrophoretic particle 10. As examples of these functional groups, for a carbon material such as carbon black, an aniline derivate such as 4-vinylaniline is used, and for a metal oxide, an organic silane derivative such as 3-(trimethoxysilyl)propyl methacrylate is used. Examples of polymerizable functional groups include a vinyl group, an acryl group, and a methacryl group.

The surface-treatment material is a material capable of grafting on the surface of the electrophoretic particle 10 to which a polymerizable functional group is introduced (grafting material). The grafting material preferably has a polymerizable functional group and a dispersing functional group which is able to be dispersed in the insulating liquid 1 and also keep dispersibility thereof with steric hindrance. The kind of polymerizable functional group is similar to that of the adsorptive material mentioned above. When the insulating liquid 1 is paraffin, a dispersing functional group is, for example, a brunched alkyl group. To polymerize and graft the grafting material, for example, polymerization initiator such as azobisisobutyronitrile (AIBN) may be used.

Just for reference, the method of dispersing the electrophoretic particle 10 in the insulating liquid 1 as described above is disclosed in detail in, for example, "Dispersion technology of super-fine particles and the evaluation thereof, surface treatment, grinding, and dispersion stability in air/liquid/polymer" published by Science & Technology.

[Porous Layer]

The porous layer 20 is a three-dimensional structure (irregular network structure like a non-woven fabric) formed of fibrous structure 21 as shown in FIG. 2. The porous layer 20 has a plurality of interstices (fine pores 23) to move the electrophoretic particle 10 toward an area where there is no fibrous structure 21. FIG. 1 briefly shows the configuration of the porous layer 20.

The fibrous structure 21 has one or two or more non-electrophoretic particles 22, which are retained by the fibrous structure 21. In a three-dimensional structure, i.e. the porous layer 20, one fibrous structure 21 may tangle randomly in the porous layer 20, or a plurality of fibrous structures 21 may randomly overlap in the porous layer 20, or both may exist together. In a case where the plurality of fibrous structures 21 exist, each fibrous structure 21 preferably retains one or two or more non-electrophoretic particles 22. FIG. 2 shows a case where the porous layer 20 is formed of the plurality of fibrous structures 21.

The porous layer 20 is a three-dimensional structure formed by the fibrous structure 21 as mentioned above, and thereby allows diffuse reflection of outside light (multiple scattering) by the irregular cubic structure thereof. It is thus possible that the porous layer 20 has a higher optical reflectance and also reduces the thickness thereof. As a result, higher contrast is achieved, and also energy required to move the electrophoretic particle 10 is reduced. It is also possible that fine pores 23 have a wider average pore diameter and the number of the fine pores 23 increases, and thereby the electrophoretic particle 10 becomes easy to move through the fine pores 23. Accordingly, it becomes possible that the electrophoretic particle 10 moves in a shorter time and the energy required to move the electrophoretic particle 10 is reduced.

The fibrous structure 21 has a non-electrophoretic particle 22 as mentioned above, and thus provides a greater diffuse reflection of outside light and also higher optical reflectance of the porous layer 20 by the greater diffuse reflection. Accordingly, contrast becomes higher.

The fibrous structure 21 is a fibrous material having a length sufficiently longer than its fiber diameter (diameter). The fibrous structure 21 may be formed by one or two or more kinds of, for example, polymer materials or inorganic materials, and alternatively, may be formed by other materials. Examples of polymer materials include nylon, polylactate, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinyl pyrolidone, polyvinylidene fluoride, polyhexafluoropropylene, cellulose acetate, collagen, gelatin, chitosan, or a copolymer thereof. Examples of inorganic materials include titanium oxide and the like. A preferred material for forming the fibrous structure 21 is a polymer material. Since polymer materials are weakly reactive (photoreaction) (i.e. chemically stable), unintended degradation of the fibrous structure 21 is suppressed. When the fibrous structure 21 is formed by a high-reactive material, the fibrous structure 21 preferably has a surface thereon covered by a given protective layer.

The shape (appearance) of the fibrous structure 21 is not particularly limited, provided that the fibrous structure 21 is in a fibrous form sufficiently longer than the fiber diameter. Specifically, the shape may be linear, fizzed, or partially bended. The fibrous structure 21 may not only extend in a single direction but also may be partially bended to extend in one or two or more directions. The method of forming the fibrous structure 21 is not particularly limited, and is preferably, for example, a phase separation method, a phase inversion method, an electrostatic spinning (electro-spinning) method, a melt spinning method, a wet spinning method, a dry spinning method, a gel spinning method, a sol-gel method, a spray coating method, or the like. These methods provide easy and stable formation of a fibrous material with a length sufficiently longer than its fiber diameter.

The average fiber diameter of the fibrous structure 21 is not particularly limited, and is preferably as small as possible. With a small fiber diameter, it becomes possible that light is easily diffusely reflected and an average pore diameter of the fine pores 23 increases. However, there may be a need to determine an average fiber diameter of the fibrous structure 21 so that the fibrous structure 21 retains the non-electrophoretic particle 22. The average fiber diameter of the fibrous structure 21 is thus preferably 10 μm or less. The lower limit of the average fiber diameter is not particularly limited, and may be, for example 0.1 μm and may be less than 0.1 μm. The average fiber diameter is determined by microscope observation with a scanning electron microscope (SEM), or the like, for example. The average length of the fibrous structure 21 may be freely set.

The average pore diameter of the fine pore 23 is not particularly limited, and is preferably as wide as possible. As a result, the electrophoretic particle 10 passes through the fine pores 23 to easily move. The average pore diameter of the fine pore 23 is thus preferably from 0.1 μm to 10 μm.

The thickness of the porous layer 20 is not particularly limited, and is, for example, from 5 μm to 100 μm. With these thicknesses, it becomes possible that the porous layer 20 has a higher shielding property, and also the electrophoretic particle 10 becomes easy to pass through the fine pores 23 to easily move.

Specifically, the fibrous structure 21 is preferably a nanofiber in which the cubic structure is complicated to provide diffuse reflection of outside light. The optical reflectance of the porous layer 20 thus increases and also the volume ratio of the fine pores 23 occupying in a unit volume of the porous layer 20 is increased, and thereby the electrophoretic particle 10 becomes easy to move through the fine pores 23. Accordingly, contrast becomes higher, and also energy required to move the electrophoretic particle 10 is reduced. A nanofiber is a fibrous material having a fiber diameter of from 0.001 μm to 0.1 μm and a length more than 100 times longer than its fiber diameter. The fibrous structure 21 being a nanofiber is preferably formed by an electrostatic spinning process, which provides easy and stable formation of the fibrous structure 21 having small fiber diameter.

The fibrous structure 21 preferably has different optical reflection characteristics from those of the electrophoretic particle 10. Particularly, the optical reflectance of the fibrous structure 21 is not particularly limited, and is preferably set so that at least the porous layer 20 entirely shields the electrophoretic particle 10. As mentioned above, contrast is achieved using an optical reflectance difference between the electrophoretic particle 10 and the porous layer 20. The fibrous structure 21 having an optical transmissibility (colorless) in insulating liquid 1 is thus not preferred. However, when there is almost no influence of the optical reflectance of the fibrous structure 21 on that of the entire porous layer 20 which is substantially determined by the optical reflectance of the non-electrophoretic particle 22, the optical reflectance of the fibrous structure 21 may be freely set.

The non-electrophoretic particle 22 is a particle which is fixed to the fibrous structure 21 and is not electrophoresed. A material for forming the non-electrophoretic particle 22 is similar to the material for forming the electrophoretic particle 10, and is selected according to the function of the non-electrophoretic particle 22 as described below.

The non-electrophoretic particle 22 may also be partially exposed on the surface of fibrous structure 21 or may be embedded within the fibrous structure 21, provided that the non-electrophoretic particle 22 is retained by the fibrous structure 21.

The non-electrophoretic particle 22 has different optical reflection characteristics from those of the electrophoretic particle 10. The optical reflectance of non-electrophoretic particle 22 is not particularly limited, but is preferably set so that at least the porous layer 20 is capable of shielding the electrophoretic particle 10 overall. As described above, contrast is thus achieved utilizing the difference between the optical reflectance of the electrophoretic particle 10 and the optical reflectance of the porous layer 20.

A specific material for forming the non-electrophoretic particle 22 is selected according to the function of the non-electrophoretic particle 22 to achieve contrast. Specifically, a material in a case where light display is performed by the non-electrophoretic particle 22 is similar to that of the electrophoretic particle 10 to perform light display by the electrophoretic particle 10. Further, a material in a case where dark display is performed by the non-electrophoretic particle 22 is similar to that of the electrophoretic particle 10 to perform dark display by the electrophoretic particle 10. Specifically, a material for the non-electrophoretic particle 22 to be used for light display is preferably metal oxides, and more preferably titanium oxide. These materials have excellent electrochemical stability and fixity and also provide high optical reflectance to the non-electrophoretic particle 22. The material for forming the non-electrophoretic particle 22 may be of the same kind as or different kind from that of the electrophoretic particle 10 provided that contrast is obtainable.

The visible color of the non-electrophoretic particle 22 used for light display or dark display is similar to the visible color of the electrophoretic particle 10 described above.

An example of a procedure for forming the porous layer 20 will be described below. At first, a spinning solution is produced by dispersion or dissolution of a material for forming the fibrous structure 21 (e.g. a polymer material or the like) in, for example, an organic solvent. Subsequently, to the spinning solution, the non-electrophoretic particle 22 is added, followed by fully stirring to disperse the non-electrophoretic particle 22. Finally, spinning is performed with the spinning solution by the electrostatic spinning process. The non-electrophoretic particle 22 is thus retained by the fibrous structure 21, and the porous layer 20 is then formed.

[SP value]

In the electrophoretic element according to the embodiment of the present technology, the relationship between SP values of components therein is adjusted. Definition of an SP value is as described above.

Specifically, the difference between the SP value A of the fibrous structure 21 and the SP value B of the electrophoretic particle 10 surface (SP value difference: $\Delta 1 = A - B$) is in the range from 2 to 5.2. Compared to the SP value difference $\Delta 1$ out of the range, the adsorption of the electrophoretic particle 10 to the fibrous structure 21 surface is reduced. Consequently, the electrophoretic particle 10 becomes easy to move in response to an electric field. Apparent optical reflectance of the porous layer 20 thus becomes less likely to decrease, resulting in improved contrast. Further, the adjustment of SP value shortens time required to move the electrophoretic particle 10 and also reduces energy required for the movement thereof.

The reason that, as a subject to which the electrophoretic particle 10 is adsorbed, the fibrous structure 21 in the porous layer 20 receives attention is that the fibrous structure 21 occupies a large volume in the entire porous layer 20. In order to improve the disadvantage caused by the adsorption of the electrophoretic particle 10 to the porous layer 20, there may be substantially a need that the adsorption behavior of the electrophoretic particle 10 to the fibrous structure 21 is improved.

Further, the reason that, in order to specify the SP value of the electrophoretic particle 10, the "SP value on a particle surface" receives attention is that the SP value of an electrophoretic particle is substantially determined depending on the type of atoms or functional groups existing on a particle surface as described above.

The material for forming the fibrous structure 21, which has already been described, is not particularly limited, provided that the SP value difference $\Delta 1$ is within the above appropriate range. Specifically, when the fibrous structure 21 is formed of a polymer material, the polymer material preferably contains at least one of a cyano group, a chloro group, and amide bond. For the above relationship with the material for forming the electrophoretic particle 10, such fibrous structure 21 may easily provide the SP value difference $\Delta 1$ within the above appropriate range. The same is true in the case of the fibrous structure 21 formed of an inorganic material covered with a polymer material. Examples of polymer materials containing a cyano group include polyacrylonitrile and the like. Examples of a polymer material containing a chloro group include polyvinyl chloride, polyvinylidene chloride, and the like. Examples of polymer materials containing amide bond include nylon, polyacrylimide, and the like.

The material for forming the electrophoretic particle 10, which has already been described, is not particularly limited, provided that the SP value difference $\Delta 1$ is within the above appropriate range just as the material for forming the fibrous structure 21. Specifically, when there is a polymer material on the surface of the electrophoretic particle 10, the electrophoretic particle 10 preferably has at least one of an alkyl group, an alkyl halide group, and an amino group thereon. For the above relationship with the series of materials for forming the fibrous structure 21, such electrophoretic particle 10 may easily provide the SP value difference $\Delta 1$ within the above appropriate range. The alkyl group and the alkyl halide group may be linear or branched, and the number of carbon atoms is freely set. An alkyl halide group is one having an alkyl group in which at least one hydrogen is substituted by a halogen atom, and the halogen is, for example, fluorine, chlorine, bromine, or the like. The term "case where there is a polymer material on the surface of the electrophoretic particle 10" means, for example, a case where the electrophoretic particle 10 is formed of a carbon material covered with a polymer material or the like, or a case where the electrophoretic particle 10 is formed of a polymer material, or other cases. By the alkyl group or the like existing on the surface of the electrophoretic particle 10, the SP value of the electrophoretic particles 10 is practically determined.

Particularly, since the electrophoretic particle 10 and the porous layer 20 are placed in the insulating liquid 1, for example, the difference (SP value difference: $\Delta 2 = A - C$) between the SP value A of the fibrous structure 21 and the SP value C of the insulating liquid 1 is preferably in the range from 3.5 to 6.5. Compared to the SP value difference $\Delta 2$ out of the above range, since it becomes hard for the electrophoretic particle 10 to be very close to each other, the aggregation of the electrophoretic particle 10 is reduced. Additionally, since it becomes hard for the electrophoretic particle 10 to be close to the surface of the fibrous structure 21, the adsorption of the electrophoretic particle 10 to the fibrous structure 21 is reduced. The electrophoretic particle 10 thus becomes likely to move in response to an electric field, and then improved contrast is achieved. Additionally, the time required to move the electrophoretic particle 10 is shortened and also the energy for the movement decreases.

[Preferred Display Method in Electrophoretic Element]

In the electrophoretic element, the difference between the optical reflectance of the electrophoretic particle 10 and the optical reflectance of the porous layer 20 (the fibrous structure 21 having the non-electrophoretic particle 22) is utilized to achieve contrast. For the contrast formation, the electrophoretic particle 10 and the porous layer 20 may be respectively used for light display and dark display, or the reverse thereof. Such division of functions is determined according to the relationship in magnitude of the optical reflectance of the electrophoretic particle 10 and the optical reflectance of the porous layer 20. It is then set so that the optical reflectance of the component for light display is higher than that for dark display.

Specifically, dark display by the electrophoretic particle 10, and light display by the porous layer 20 are preferable. Accordingly, when the optical reflectance of the porous layer 20 is practically determined by that of the non-electrophoretic particle 22, it is preferred that the optical reflectance of the non-electrophoretic particle 22 be higher than that of the electrophoretic particle 10. In this case, since the optical reflectance in light display is increased dramatically in the presence of diffuse reflection of outside light in the porous layer 20, contrast is enhanced dramatically according to the diffuse reflection.

[Electrophoretic Element Operation]

In the electrophoretic element, when an electric field is applied, the electrophoretic particle 10 moves through the fine pores 23 of the porous layer 20 in response to the electric field. Thus, with observation of the electrophoretic element from the side where the electrophoretic particle 10 has moved, a display color is decided by the optical reflectance of the electrophoretic particle 10 in an area where the electrophoretic particle 10 has moved, and also a display color is decided by the optical reflectance of the porous layer 20 in an area where the electrophoretic particle 10 has not moved. Accordingly, it becomes possible that contrast is achieved by utilizing the difference in the optical reflectance between the electrophoretic particle 10 and the porous layer 20.

[Function and Effect of Electrophoretic Element]

According to the electrophoretic element, the porous layer 20 is formed of the fibrous structure 21 including the non-electrophoretic particle 22 with different optical reflection characteristics from those of the electrophoretic particle 10, and the SP value difference Δ1 is from 2 to 5.2. Accordingly, as described above, compared to the SP value difference Δ1 out of the above range, the absorption of the electrophoretic particle 10 to the surface of the fibrous structure 21 is reduced, and thereby the apparent optical reflectance of the porous layer 20 is less likely to decrease. Additionally, since the porous layer 20 has fine pores 23 being sufficient in diameter and number and also a small thickness sufficient to provide diffuse reflection of outside light, the optical reflectance of the porous layer 20 increases. As a result, improved contrast is obtainable.

In the case, since the electrophoretic particle 10 becomes easy to move in response to an electric field, the time required to move the electrophoretic particle 10 is shortened and also the energy for the movement decreases. Accordingly, the improved response rate as well as reduced power consumption may be achieved.

Additionally, the porous layer 20 has the fine pores 23 sufficient in diameter and number and also a decreased thickness, and thus allows the electrophoretic particle 10 to move through the fine pores 23. Accordingly, the improved response rate as well as reduced power consumption may be achieved.

Particularly, the SP value difference Δ2 of from 3.5 to 6.5 suppresses, for example, aggregation of the electrophoretic particles 10 and adsorption of the electrophoretic particle 10 to the fibrous structure 21, and thus provides higher contrast.

When the fibrous structure 21 is formed of a polymer material containing a cyano group or the like, or when the electrophoretic particle 10 has an alkyl group or the like on the surface thereof, it is possible to easily set the SP value so that the SP value difference Δ1 is in the above appropriate range.

Alternatively, when the fibrous structure 21 is formed by an electrostatic spinning process or when the fibrous structure 21 is a nano-fiber having an average fiber diameter of 10 μm or less, a three-dimensional structure providing higher diffuse reflection of outside light may be formed by such fibrous structure 21. Such fibrous structure 21 also allows increase in pore diameter and number of the fine pores 23, and thereby provides a higher effect.

Additionally, since the optical reflectance of the non-electrophoretic particle 22 is higher than that of the electrophoretic particle 10, when the electrophoretic particle 10 and the porous layer 20 are respectively used for dark display and light display, the optical reflectance of the porous layer 20 becomes higher due to diffuse reflection of outside light. Consequently, a higher effect is obtainable.

[2. Application Example of Eelectrophoretic Element (Display)]

Next, an application example of the above electrophoretic element will be described.

The electrophoretic element according to the embodiment of the present technology is applicable to various uses such as a display, which are not particularly limited. Hereinafter, as a representative of the various uses, a case of applying the electrophoretic element to a display will be described. Note that the configuration of a display in the following description is just one example and may be suitably modified.

[Entire Configuration of Display]

Figure 3:
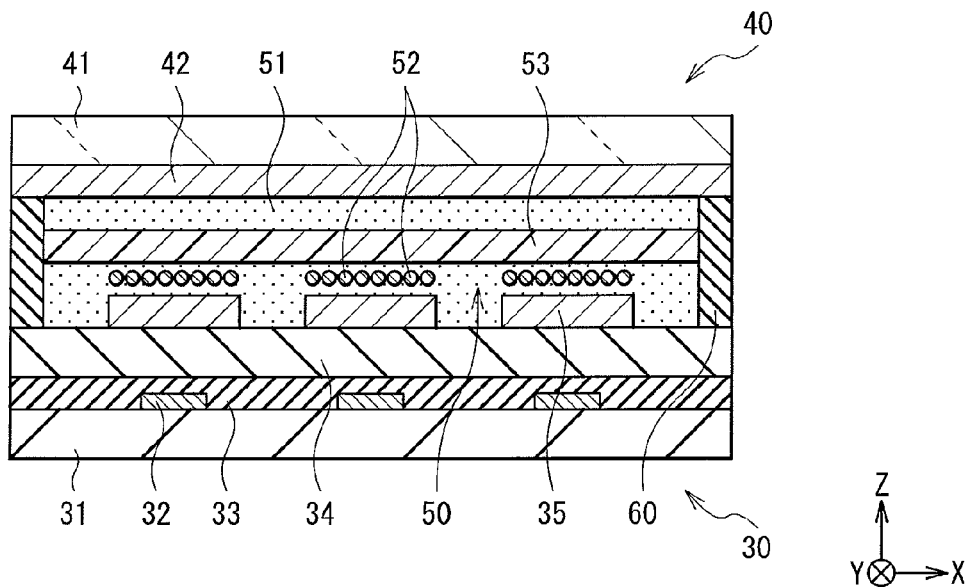
FIG. 3 is a cross-sectional view illustrating a configuration of a display using an electrophoretic element according to an embodiment of the present technology.

FIG. 3 illustrates a cross-sectional configuration of a display. The display described herein refers to an electrophoretic-type display to display images (for example, character information etc.) using an electrophoretic phenomenon, that is to say, an electronic paper display.

The display in which, as shown in FIG. 3, a driving substrate 30 is arranged to oppose a counter substrate 40 with an electrophoretic element 50 and a spacer 60 in between has a display surface on its counter substrate 40 side. The term "has a display surface on its counter substrate 40 side" means that images are displayed in the direction of the counter substrate 40 (a user can see images).

[Driving Substrate]

The driving substrate 30 is produced by forming: a thin film transistor (TFT) 32, a protective layer 33, a planarized insulating layer 34, and a pixel electrode 35 in this order, on one surface of the support base 31. The TFT 32 and the pixel electrode 35 are separately formed in, for example, a matrix or segment form depending on a pixel pattern and the like.

The support base 31 is formed of, for example, an inorganic material, a metal material, a plastics material, or the like. Examples of the inorganic material include silicon (Si), silicon oxides ($SiO_x$), silicon nitrides ($SiN_x$), or aluminum oxides ($AlO_x$). Examples of silicon oxides include glass and spin-on-glass (SOG). Examples of the metal material include aluminum (Al), nickel (Ni), or stainless steel. Examples of the plastics material include polycarbonate (PC), polyethylene terephthalate (PET), polyethylene naphthalate (PEN), or polyether ether ketone (PEEK).

The support base 31 may be optical transmissive or optically non-transmissive. Since images are displayed on the counter substrate 40 side, there is no need for the support base 31 to be optically transmissive. The support base 31 may be a substrate having rigidity such as a wafer, or flexible thin film glass or a film, and specifically preferably be the flexible thin film glass or the film. Consequently, a flexible (bendable) display is obtainable. The above film is, for example, a polymer or metal film, or the like.

The TFT 32 is a switching element to select a pixel. The TFT 32 may be an inorganic TFT formed of an inorganic semiconductor layer as a channel layer, or an organic TFT formed of an organic semiconductor layer. The protective layer 33 and the planarized insulating layer 34 are formed of an insulating material such as, for example, polyimide. However, if the protective layer 33 surface is sufficiently even, there may be no planarized insulating layer 34. The pixel electrode 35 is formed of a conductive material such as gold (Au), silver (Ag), copper (Cu), and the like. The pixel electrode 35 is connected to the TFT 32 through a contact hole (not illustrated) provided in the protective layer 33 and the planarized insulating layer 34.

[Counter Substrate]

The counter substrate 40 is one in which a counter electrode 42 is formed all over a surface of the support base 41. The counter electrode 42 may be separately formed in a matrix or segment form just like the pixel electrode 35.

The support base 41 is formed of a similar material to that of the support base 31 except for being optically transmissive. Since images are displayed at the counter substrate 40 side, there may be a need that the support base 41 is optically transmissive. The counter electrode 42 is formed of an optically transmissive conductive material (transparent electrode material) such as indium tin oxide (ITO), antimony tin oxide (ATO), fluorine-doped tin oxide (FTO), aluminum-doped zinc oxide (AZO), and the like.

When images are displayed at the counter substrate 40 side, the display (the electrophoretic element 50) is viewed through the counter electrode 42. The optical transmittance of the counter electrode 42 is thus preferably as high as possible, for example, 80% or higher. The electrical resistance of the counter electrode 42 is preferably as low as possible, for example, 100Ω/□ or less.

[Electrophoretic Element]

The electrophoretic element 50 has a similar configuration to that of the above electrophoretic element. Specifically, the electrophoretic element 50 has an electrophoretic particle 52 and a porous layer 53 having a plurality of fine pores (not shown in FIG. 3) in an insulating liquid 51. The insulating liquid 51, the electrophoretic particle 52, and the porous layer 53 respectively have similar configurations to those of the insulating liquid 1, the electrophoretic particle 10, and the porous layer 20.

A space between the driving substrate 30 and the counter substrate 40 is filled with the insulating liquid 51. The porous layer 53 may be supported by a spacer 60. The porous layer 53 may be apart from the pixel electrode 35 and the counter electrode 42, or may be adjacent to either one of the two. The electrophoretic particle 52 is able to move toward the pixel electrode 35 or toward the counter electrode 42 as appropriate.

[Spacer]

The spacer 60 is formed of an insulating material such as a polymer material. The shape of the spacer 60 is not particularly limited. However, a specifically preferred shape is one which does not prevent the movement of the electrophoretic particle 52 and also provides uniform distribution of the electrophoretic particle 52, and thus is, for example, grid-like. The thickness of the spacer 60 is not particularly limited, but, in particular, is as thin as possible for decrease in power consumption and may be, for example, from 10 μm to 100 μm.

[Display Operation]

Figure 4:
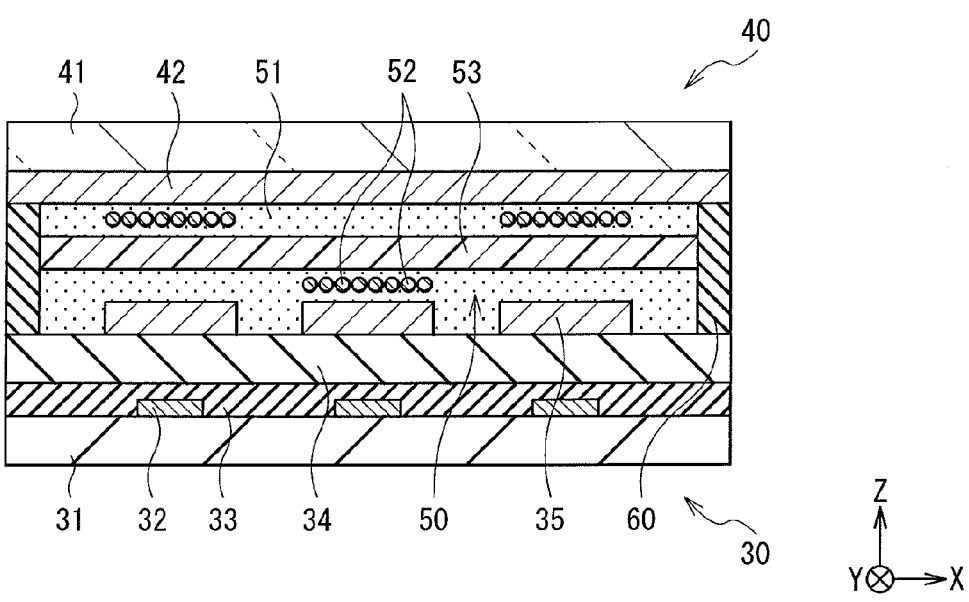
FIG. 4 is a cross-sectional view for explaining operation of the display.

The display is operated, for example, in the following manner. FIG. 4 is a diagram for explaining the operation of the display, and the cross-sectional configuration thereof is corresponding to that shown in FIG. 3.

There is described herein an operation in the case where, for example, the optical reflectance of the electrophoretic particle 52 is lower than that of the porous layer 53, and thus the electrophoretic particle 52 and the porous layer 53 are respectively used for dark display and light display.

In the initial state of all pixels, as shown in FIG. 3, the electrophoretic particle 52 is positioned in a region close to the pixel electrode 35 in the insulating liquid 51. In view of the display from the display surface side (from the upper side of FIG. 3), since the electrophoretic particle 52 is shielded by the porous layer 53 in all pixels (light display), contrast is not obtained (no display images).

When the selection of a pixel by TFT 32 and the subsequent application of an electric field between the pixel electrode 35 and the counter electrode 42 are performed, as shown in FIG. 4, the electrophoretic particle 52 moves toward the counter electrode 42 through the fine pores of the porous layer 53 in the pixel to which an electric field is applied. In this case, in view of the display from the display surface side, there are two types of pixels, that is, a pixel in which the electrophoretic particle 52 is shielded by the porous layer 53 (light display state), and a pixel in which the electrophoretic particle 52 is not shielded by the porous layer 53 (dark display state). Consequently, contrast is obtained by utilizing the difference in display color. Such display color conversion for each pixel (light-dark display) allows image display by using contrast in the entire display surface.

[Function and Effect of Display]

In the display according to the embodiment of the present technology, since the electrophoretic element 50 has a similar configuration to that of the electrophoretic element described above, improved contrast is obtainable. Other effects thereof are similar to those of the electrophoretic element described above.

[3 Application Example of Display (Electronic Device)]

Next, application examples of the above display will be described.

The display according to the embodiment of the present technology is applicable to electronic devices for various uses, and a kind of an electronic device is not limited to a specified kind. The display may be mounted on, for example, the following electronic devices. However, the following electronic device, which is merely one example, is modifiable as appropriate.

Figure 5A:
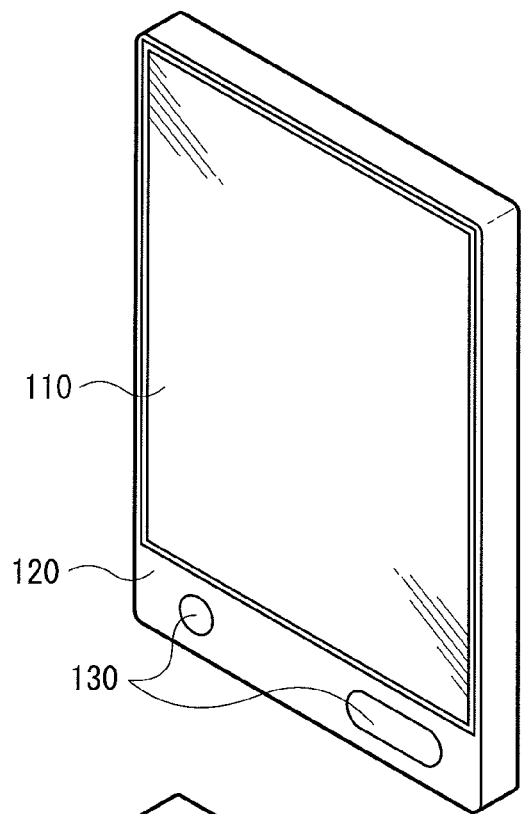
FIGS. 5A and 5B are perspective views respectively illustrating the configurations of an electronic book employing the display.
Figure 5B:
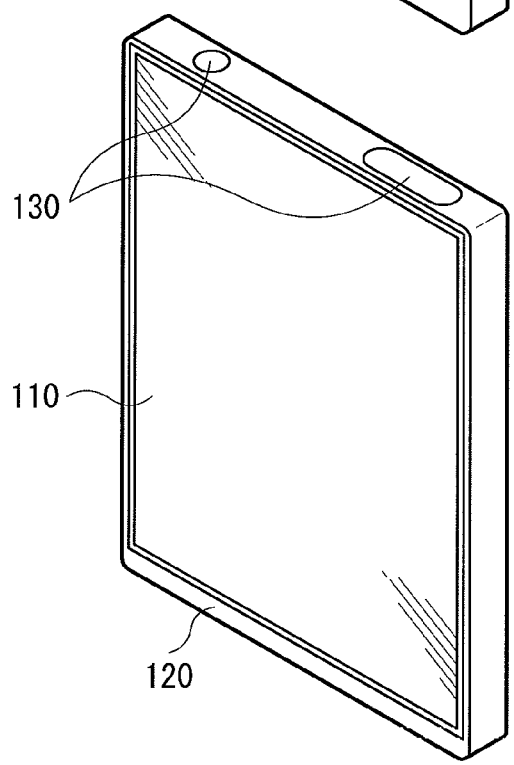

FIGS. 5A and 5B illustrate appearance configurations of an electronic book. The electronic book has, for example, a display section 110, a non-display section (chassis) 120, and an operation section 130. The operation section 130 may be provided at a front surface of the non-display section 120 as shown in FIG. 5A, or on a top surface of the non-display section 120 as shown in FIG. 5B. The display may also be mounted on a personal digital assistant (PDA) having a similar configuration to that of the electronic book shown in FIG. 5.

Figure 6:
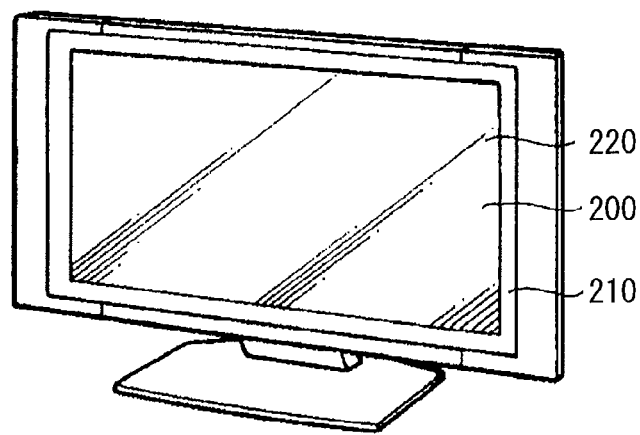
FIG. 6 is a perspective view illustrating a configuration of a television device employing the display.

FIG. 6 illustrates an appearance configuration of a television device. The television device has, for example, a video display screen section 200 including a front panel 210 and a filter glass 220.

Figure 7A:
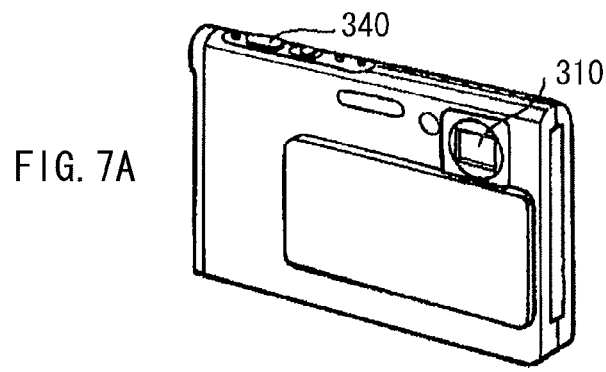
FIGS. 7A and 7B are perspective views respectively illustrating configurations of a digital still camera employing the display.
Figure 7B:
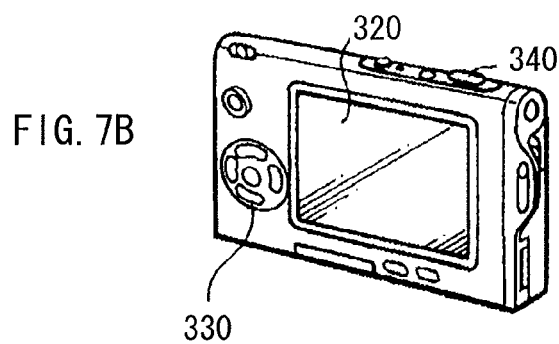

FIGS. 7A and 7B illustrate an appearance configuration of a digital still camera, and respectively illustrate the front and the back of the digital still camera. The digital still camera has, for example, a light-emitting section 310 for a flash, a display section 320, a menu switch 330, and a shutter button 340.

Figure 8:
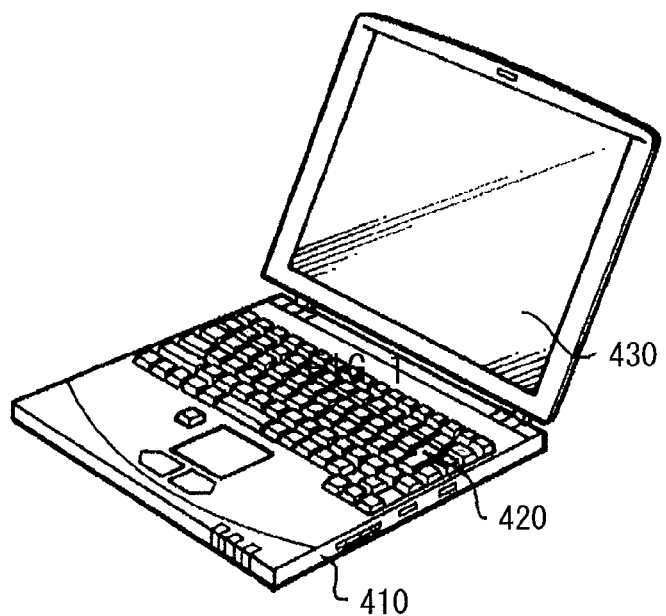
FIG. 8 is a perspective view illustrating an appearance of a personal computer employing the display.

FIG. 8 illustrates an appearance configuration of a notebook personal computer. The notebook personal computer has, for example, a body 410, a keyboard 420 to input characters or the like, and a display section 430 to display images.

Figure 9:
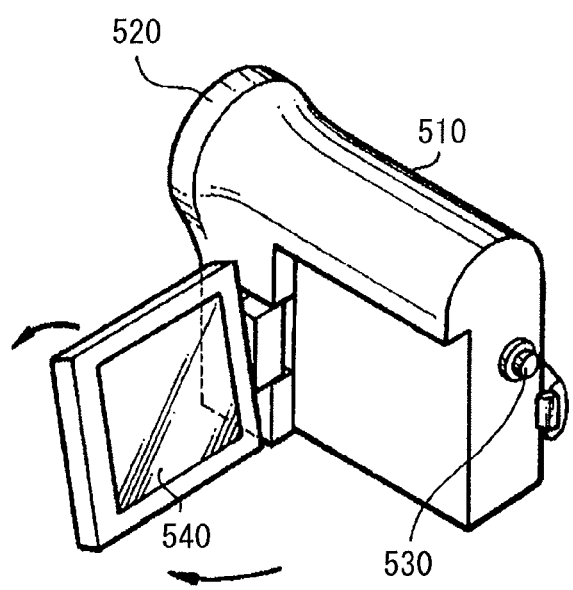
FIG. 9 is a perspective view illustrating an appearance of a video camcorder employing the display.

FIG. 9 illustrates an appearance configuration of a video camcorder. The video camcorder has, for example, a main body 510, an image-capturing lens 520 provided on the front of the main body 510, a shooting start/stop switch 530, and a display section 540.

FIGS. 10A to 10G illustrate an appearance configuration of a cell phone. FIGS. 10A and 10B respectively illustrate the front and the side of the cell-phone in an opening state. FIGS. 10C to 10G respectively illustrate the front, the left-side, the right-side, the top, and the bottom of the cell phone in a closing state. The cell phone, in which, for example, an upper chassis 610 and a lower chassis 620 are joined each other with a joint section (hinge section) 630, has a display 640, sub-display 650, a picture light 660, and a camera 670.

EXAMPLES

Next, examples according to an embodiment of the present technology will be described in detail.

Experimental Example 1

According to the following procedures, a display was produced by use of electrophoretic particles for dark display and a porous layer for light display.

[Preparation of Electrophoretic Particles]

A solution A was obtained by dissolving 42.624 g of sodium hydroxide and 0.369 g of sodium silicate in 43 g of water. Subsequently, 5 g of complex oxide fine particles (DAIPYROXIDE Color TM3550 manufactured by Dainichiseika Color & Chemicals Mfg. Co., Ltd) were added to the solution A with stirring, followed by further stirring (15 mins.), and then the mixture solution was stirred by ultrasonic stirring (at 30° C. to 35° C., 15 mins.). Subsequently, after heating the solution A containing the complex oxide fine particles (at 90° C.), 15 cm$^3$ (equivalent to ml) of 0.22 mol/cm$^3$ sulfuric acid and 7.5 cm$^3$ of a solution in which 6.5 mg of sodium silicate and 1.3 mg of sodium hydroxide were dissolved were delivered by drops into the solution A over 2 hours. Subsequently, after cooling the solution A (to room temperature), 1.8 cm$^3$ of 1 mol/cm$^3$ sulfuric acid was added to the solution A, and the mixture was subjected to centrifugation (3700 rpm, 30 mins.) to separate the precipitate from the solution A (decantation). The precipitate was dispersed again in ethanol to be subjected to centrifugation (3500 rpm, 30 mins.) and decantation. This process was performed twice in total. Subsequently, the mixture solution containing 5 cm$^3$ of ethanol and 0.5 cm$^3$ of water was added to the precipitate in each bottle, and then the resultant solution was stirred by ultrasonic stirring (1 hour). The dispersed solution of silane-covered complex oxide particles was then obtained.

The whole mixture containing 3 cm$^3$ of water, 30 cm$^3$ of ethanol, and 4 g of N-[3-(trimethoxysilyl)propyl]-N'-(4-vinylbenzyl)ethylenediamine hydrochloride (40% methanol solution) was stirred (7 mins.), and all of the dispersed solution was added to the resultant. After stirring (10 mins.), the mixture solution was subjected to centrifugation (3500 rpm, 30 mins.). After the subsequent decantation, the washing process in which the obtained precipitate was dispersed again in ethanol to be subjected to centrifugation (3500 rpm, 30 mins.) was performed twice in total. After further decantation, the resulted precipitate was dried under reduced pressure (at room temperature) (6 hours) and subsequently under reduced pressure (70° C.) (2 hours) to obtain a solid.

To the above solid, 50 m$^3$ of toluene was added, and the solution B was then obtained. The solution B was stirred by a roll mill (12 hours). To the solution B poured into a three-necked flask, 1.7 g of 2-ethylhexyl acrylate was added to be stirred under nitrogen stream (20 mins.). Subsequently, the solution B, which was stirred (50° C., 20 mins.), was added to a solution C in which 0.01 g of azobisisobutyronitrile (AIBN) was dissolved in 3 cm$^3$ of toluene, and the mixture solution was heated (65° C.). After the subsequent stirring (1 hour), the mixture solution was cooled (to room temperature) to be poured with ethyl acetate into a bottle, followed by centrifugation (3500 rpm, 30 mins.). After the subsequent decantation, the washing process that the precipitate was dispersed again in ethyl acetate to be subjected to centrifugation (3500 rpm, 30 mins.) was performed three times in total. The resulted precipitate was dried under reduced pressure (at room temperature) (12 hours), and subsequently under reduced pressure (70° C.) (2 hours). Consequently, black electrophoretic particles with a polymer-coated pigment were obtained.

[Preparation of Insulating Liquid]

As an insulating liquid, an isoparaffin (IsoparG manufactured by Exxon Mobil Corp.) solution containing 0.5% methoxysulfonyloxy methane (Solsperse 17000 manufactured by Lubrizol Corp.) and 1.5% Sorbitan monolaurate (Span 20) was prepared. Subsequently, 0.1 g of the electrophoretic particles was added to 9.9 g of the insulating liquid to be stirred by a bead mill (5 mins.). The mixture solution was stirred by a homogenizer with zirconia beads (0.03 mm$\phi$) (4 hours) and the zirconia beads were then removed off. The average particle size of the electrophoretic particles was measured using a zeta-potential/particle size measurement system ELSZ-2 (manufactured by Otsuka Electronics), and as a result, the average particle size was 100 nm.

[Preparation of Porous Layer]

Twelve g of polyacrylonitrile (Aldrich Corporation: molecular weights of 150000) as a material for forming a fibrous structure was dissolved in 88 g of N,N-dimethylformamide, to prepare a solution D. Subsequently, 40 g of titanium oxide (TITONE R-42 manufactured by Sakai Chemical Industry Co., Ltd.) as a non-electrophoretic particle was added to 60 g of the solution D and the resultant was mixed using a bead mill to prepare a spinning solution. The spinning solution was then poured into a syringe and was spun back and forth eight times on a glass substrate, on which a pixel electrode (ITO) in a given pattern was formed, by an electrospinning device (NANON manufactured by MECC CO., Ltd.). Spinning was carried out under the condition as follows: a field intensity was 28 kV; discharge speed was 0.5 cm$^3$/min; a spinning distance was 15 cm; and a scan rate was 20 mm/second. Subsequently, the glass substrate was dried in a vacuum oven (75° C.) for 12 hours to form a fibrous structure having non-electrophoretic particles.

[Assembly of Display]

From a no-pixel-electrode area of the glass substrate on which a pixel electrode (ITO) formed, an unnecessary porous layer in contact with the area was removed. Substantially, a spacer was arranged on a glass substrate on which a counter electrode (ITO) was formed all over the surface thereof, and then the glass substrate on which the pixel electrode and the porous layer were formed was overlaid on the spacer. In this case, a light curing resin having beads (outer diameter of 30 μm) (photosensitive resin PHOTOREK A-400 manufactured by Sekisui Chemical Co., Ltd.) was drawn in positions not overlaying on the porous layer. Finally, the insulating liquid with the electrophoretic particles dissolved was poured into a space between the two glass substrates.

Experimental Example 2

A display was produced in a similar procedure to that of Experimental Example 1 except that, in the preparation process of the porous layer, alcohol-soluble nylon (Elvamide 8061 manufactured by DuPont) and a mixture solvent of methanol and dichloromethane (in a weight ratio of 1:1) were respectively used as alternatives for polyacrylonitrile and N,N-dimethylformamide.

Experimental Example 3

A display was produced in a similar procedure to that of Experimental Example 1 except that, in the preparation process of the electrophoretic particles, the mixture of 1-styrene and 2-ethylhexyl acrylate (in a weight ratio of 1:1) was used as an alternative for 2-ethylhexyl acrylate.

Experimental Example 4

A display was produced in a similar procedure to that of Experimental Example 2 except that, in the preparation process of the electrophoretic particles, butyl acrylate was used as an alternative for 2-ethylhexyl acrylate.

Experimental Example 5

A display was produced in a similar procedure to that of Experimental Example 2 except that, in the preparation process of the insulating liquid, n-dodecane was used as an alternative for an isoparaffin-based solvent.

Experimental Example 6

A display was produced in a similar procedure to that of Experimental Example 1 except that, in the preparation process of the porous layer, polyacrylamide and dimethylformamide were respectively used as alternatives for polyacrylonitrile and N,N-dimethylformamide.

Experimental Examples 7 and 8

Both displays were produced in a similar procedure to that of Experimental Example 2 except that, in the preparation process of the porous layer, as alternatives for polyacrylonitrile, polymethylmethacrylate was used in Experimental Example 7, and polyvinylidene fluoride was used in Experimental Example 8.

Experimental Example 9

A display was produced in a similar procedure to that of Experimental Example 2 except that, in the preparation process of the porous layer, nylon in which amine moiety was substituted by a methoxymethyl group (FR-105 manufactured by Nagase ChemteX Corporation) was used as an alternative for alcohol-soluble nylon.

In Experimental Examples 1 to 9, the SP value A of the fibrous structure, the SP valve B of the electrophoretic particle surface, the SP value C of the insulating liquid, and the SP value differences $\Delta 1$ and $\Delta 2$ are shown in Table 1. As described above, the SP value of each material was calculated based on the regular solution theory introduced by Hildebrand. However, for the SP value of an isoparaffin-based solvent being a insulating liquid, the SP value thereof described in a catalog (=7.3) was adopted. Additionally, for the SP value B in Experimental Example 3, the average value of the SP values B between 1-styrene (=9.2) and 2-ethylhexyl acrylate (=8.6) was adopted (=8.9).

The determination of each contrast in the displays according to Experimental Examples 1 to 9 provides a result shown in Table 1. In order to examine contrast of the displays, white reflectance (%) and black reflectance (%) of a forty-five degree ring light source along the normal direction of the substrate to a standard diffuser were measured with a spectrophotometer (MCPD 7000 manufactured by Otsuka Electronics, Inc.). In this case, during the application of a voltage (drive voltage of 15 V) for sufficient time in a state of white display, white reflectance was measured at a point of the reflectance in a stable condition. Contrast was calculated as the ratio of white reflectance to black reflectance (white reflectance/black reflectance).

TABLE 1

| Experimental Example | Fibrous Structure SP Value A | Electrophoretic Particle SP Value B | Insulating Liquid SP Value C | SP Value Difference $\Delta 1$ (=A − B) | SP Value Difference $\Delta 2$ (=A − C) | White Reflectance (%) | Contrast |
|---|---|---|---|---|---|---|---|
| 1 | 13.1 | 8.6 | 7.3 | 4.5 | 5.8 | 52 | 29 |
| 2 | 10.8 | 8.6 | 7.3 | 2.2 | 3.5 | 48 | 20 |
| 3 | 13.1 | 8.9 | 7.3 | 4.2 | 5.8 | 50 | 27 |
| 4 | 10.8 | 8.8 | 7.3 | 2.0 | 3.5 | 51 | 23 |
| 5 | 10.8 | 8.6 | 7.8 | 2.2 | 3.0 | 42 | 16 |
| 6 | 13.8 | 8.6 | 7.3 | 5.2 | 6.5 | 50 | 22 |
| 7 | 10.0 | 8.6 | 7.3 | 1.4 | 2.7 | 34 | 10 |
| 8 | 7.5 | 8.6 | 7.3 | −1.1 | 0.2 | 23 | 3 |
| 9 | 9.9 | 8.6 | 7.3 | 1.3 | 2.6 | 30 | 6 |

The relationships between the SP value difference $\Delta 1$ and white reflectance and between the SP value difference $\Delta 1$ and contrast were examined by varying each type of a fibrous structure, an electrophoretic particle, and an insulating liquid and the combinations thereof. As a result, it was found that the SP value difference $\Delta 1$ of from 2 to 5.2 (in Experimental Examples 1 to 6) allowed high white reflectance to be kept compared to other SP value differences $\Delta 1$ outside the above range (in Experimental Examples 7 to 9), and thus provided higher contrast. Specifically, in a case where the SP value difference $\Delta 1$ was from 2 to 5.2, when the SP value difference $\Delta 2$ was from 3.5 to 6.5, higher contrast was further obtained.

The reason that a notable difference in white reflectance and contrast was caused is considered as follows. The electrophoretic display produced by a black electrophoretic particle and a white porous layer substantially displays images corresponding to the movement of the electrophoretic particle. In this case, without the SP value difference Δ1 within the adequate range, the electrophoretic particle is likely to become unintentionally adsorbed to the fibrous structure. Due to the adsorption of the electrophoretic particle, white reflectance decreases and thus contrast is reduced. In contrast, with the SP value difference Δ1 within the adequate range, the electrophoretic particle is hard to become adsorbed to the fibrous structure. Consequently, white reflectance is kept and thus contrast is hard to decrease.

From the result of Table 1, it was found that, when the SP value difference Δ1 being a difference between the SP value A of the fibrous structure and the SP value B of the electrophoretic particles, was from 2 to 5.2, higher contrast was obtainable.

As described above, the present technology was discussed in reference to the embodiments. However, the present technology is not limited to the aspects described in the embodiments, and various modifications are possible. For example, the electrophoretic element according to the embodiment of the present technology is not limited to a display, and may be applied to other electronic devices.

The present disclosure contains subject matter related to that disclosed in Japanese Priority Patent Application JP2011-062922 filed in Japan Patent Office on Mar. 22, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. An electrophoretic element comprising:
an electrophoretic particle, and
a porous layer formed of a fibrous structure having a non-electrophoretic particle with different optical reflection characteristics from optical reflection characteristics of the electrophoretic particle,
wherein a difference Δ1 (=A−B) between a solubility parameter value A of the fibrous structure and a solubility parameter value B of a particle surface of the electrophoretic particle is 2 or more and 5.2 or less.
2. The electrophoretic element according to claim 1, wherein the electrophoretic particle and the porous layer are placed in an insulating liquid, and
a difference Δ2 (=A−C) between the solubility parameter value A of the fibrous structure and a solubility parameter value C of the insulating liquid is 3.5 or more and 6.5 or less.
3. The electrophoretic element according to claim 1, wherein the electrophoretic particle has one or more of an alkyl group, an alkyl halide group, and an amino group on the particle surface, and the fibrous structure is composed of a polymer material having one or more of a cyano group, a chloro group, and an amide bond.
4. The electrophoretic element according to claim 1, wherein the non-electrophoretic particle has optical reflectance higher than optical reflectance of the electrophoretic particle.
5. The electrophoretic element according to claim 1, wherein the electrophoretic particle and the non-electrophoretic particle are formed of one or more of organic pigments, inorganic pigments, dyes, carbon materials, metal materials, metal oxides, glass, and polymer materials, and the fibrous structure, the fibrous structure being produced by an electrostatic spinning process, and having an average fiber diameter of 10 μm or less.
6. A display comprising
an electrophoretic element between a pair of substrates, one or both of the substrates being optically transmissive,
wherein the electrophoretic element has an electrophoretic particle and a porous layer formed of a fibrous structure having a non-electrophoretic particle with different optical reflection characteristics from optical reflection characteristics of the electrophoretic particle, and
a difference Δ1 (=A−B) between a solubility parameter value A of the fibrous structure and a solubility parameter value B of a particle surface of the electrophoretic particle is 2 or more and 5.2 or less.
7. An electronic device comprising
a display having an electrophoretic element between a pair of substrates, one or both of the substrates being optically transmissive,
wherein the electrophoretic element has an electrophoretic particle and a porous layer formed of a fibrous structure having a non-electrophoretic particle with different optical reflection characteristics from optical reflection characteristics of the electrophoretic particle, and
a difference Δ1 (=A−B) between a solubility parameter value A of the fibrous structure and a solubility parameter value B of a particle surface of the electrophoretic particle is 2 or more and 5.2 or less.

* * * * *